United States Patent
Maurer et al.

(10) Patent No.: US 12,442,904 B2
(45) Date of Patent: Oct. 14, 2025

(54) COMPENSATION FOR AN ULTRASONIC TRANSDUCER WITH A VARIABLE COMPENSATION INDUCTANCE

(71) Applicant: Valeo Schalter und Sensoren GmbH, Bietigheim-Bissingen (DE)

(72) Inventors: Philipp Maurer, Bietigheim-Bissingen (DE); Bastian Hafner, Bietigheim-Bissingen (DE); Thomas Frintz, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 261 days.

(21) Appl. No.: 18/019,339

(22) PCT Filed: Jul. 28, 2021

(86) PCT No.: PCT/EP2021/071089
§ 371 (c)(1),
(2) Date: Feb. 2, 2023

(87) PCT Pub. No.: WO2022/028970
PCT Pub. Date: Feb. 10, 2022

(65) Prior Publication Data
US 2023/0288546 A1    Sep. 14, 2023

(30) Foreign Application Priority Data
Aug. 5, 2020  (DE) ................ 10 2020 120 698.4

(51) Int. Cl.
*G01S 7/52*  (2006.01)
*B06B 1/02*  (2006.01)
(Continued)

(52) U.S. Cl.
CPC ........ *G01S 7/52006* (2013.01); *B06B 1/0215* (2013.01); *G01S 7/529* (2013.01);
(Continued)

(58) Field of Classification Search
CPC ...... G01S 7/52006; G01S 7/529; G01S 15/10; G01S 15/931; B06B 1/0215;
(Continued)

(56) References Cited

U.S. PATENT DOCUMENTS

2002/0050861 A1\* 5/2002 Nguyen .............. H03F 3/45197
330/254
2008/0048751 A1  2/2008 Koen
(Continued)

FOREIGN PATENT DOCUMENTS

| CN | 101515400 A | 8/2009 |
| CN | 103534603 A | 1/2014 |

(Continued)

OTHER PUBLICATIONS

Translation of Lill et al., DE 102011118644, 2011, created Dec. 13, 2024, 6 pages. (Year: 2024).\*

(Continued)

*Primary Examiner* — Daniel L Murphy
(74) *Attorney, Agent, or Firm* — Osha Bergman Watanabe & Burton LLP

(57) ABSTRACT

An ultrasonic transducer having a piezoelectric element for use on a vehicle is disclosed. The transducer has a control and evaluation circuit for generating a control voltage for the piezoelectric element, which generates and emits an ultrasonic signal based on the control voltage, and for outputting an output signal on the basis of an echo signal received at the piezoelectric element. A gyrator circuit is included for providing a compensation inductance for adapting the control and evaluation circuit, for compensating for a parasitic connection capacitance of the piezoelectric element. The gyrator circuit has a variable compensation inductance. A method for compensating for an ultrasonic transducer having a piezoelectric element for adapting a reception sensi- (Continued)

Figure 1:
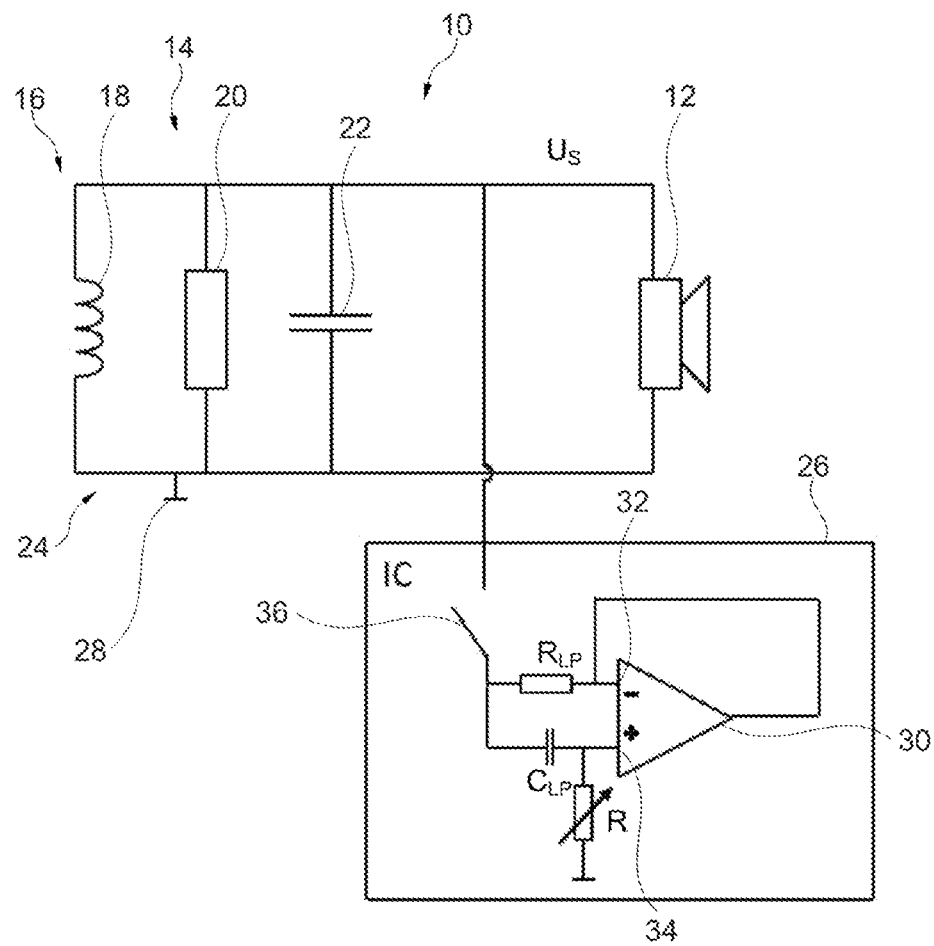

tivity is also disclosed. The method involves recording a measurement variable for adapting the reception sensitivity, and compensating for the ultrasonic transducer by changing the compensation inductance of the gyrator circuit based on the recorded measurement variable.

11 Claims, 3 Drawing Sheets

(51) Int. Cl.
    *G01S 7/529* (2006.01)
    *G01S 15/10* (2006.01)
    *G01S 15/931* (2020.01)

(52) U.S. Cl.
    CPC ............ *G01S 15/10* (2013.01); *G01S 15/931* (2013.01); *B06B 2201/40* (2013.01); *B06B 2201/55* (2013.01)

(58) Field of Classification Search
    CPC ............ B06B 2201/40; B06B 2201/55; B06B 2201/70; B06B 1/0253
    USPC .......................................................... 367/118
    See application file for complete search history.

(56) References Cited

U.S. PATENT DOCUMENTS

2009/0319212 A1* 12/2009 Cech ................. B60R 21/0136
    702/65
2019/0101645 A1    4/2019 DeMersseman et al.

FOREIGN PATENT DOCUMENTS

| CN | 110199204 A | 9/2019 |
| DE | 102005038649 A1 | 2/2007 |
| DE | 102006054095 A1 | 5/2008 |
| DE | 102008061963 A1 | 6/2010 |
| DE | 102011118644 A1 | 5/2013 |
| JP | 2013-142665 A | 7/2013 |
| KR | 10-2015-0076870 A | 7/2015 |
| WO | 2013/072167 A1 | 5/2013 |

OTHER PUBLICATIONS

Ledvina Jan et al. "A fully integrated digitally controllable grounded inductor simulator with a large inductance range for damping of ultrasonic transducers" Analog Integrated Circuits and Signal Processing, Springer New York LLC, US, vol. 102, No. 1, Jan. 25, 2019 (Jan. 25, 2019), pp. 125-130, DOI: 10.1007/S10470-019-01396-Z, ISSN: 0925-1030, XP036996247 (16 pages).
Office Action issued in counterpart Korean Patent Application No. 10-2023-7007404 mailed Nov. 14, 2024 (15 pages).
Office Action issued in counterpart Chinese Patent Application No. 202080090933.8 mailed Mar. 6, 2025 (15 pages).
Office Action issued in corresponding CN Application No. 202180053998, dated Apr. 30, 2025 (7 Pages).
International Search Report and Written Opinion in corresponding International Application No. PCT/EP2021/071089, dated Oct. 14, 2021 (16 pages).
German Search Report in corresponding German Application No. 10 2020 120 698.4, dated Jul. 27, 2021 (5 pages).

* cited by examiner

COMPENSATION FOR AN ULTRASONIC TRANSDUCER WITH A VARIABLE COMPENSATION INDUCTANCE

The present invention relates to an ultrasonic transducer comprising a piezo element, in particular for use on a vehicle, comprising an actuation and evaluation circuit for producing an actuation voltage for the piezo element that produces and emits a measurement signal depending on the actuation voltage, and for outputting an output signal on the basis of an echo signal received at the piezo element, and a gyrator circuit for providing a compensation inductance for adjusting the actuation and evaluation circuit, in particular for compensating for a parasitic connection capacitance of the piezo element.

The present invention also relates to a method for compensating an ultrasonic transducer comprising a piezo element in order to adjust a reception sensitivity, in particular for use on a vehicle, in particular for compensating an ultrasonic transducer as above.

The prior art discloses ultrasonic transducers as a basis for ultrasonic sensors for surroundings detection in vehicles. The ultrasonic transducers comprise piezo elements that in each case have to be actuated with an AC voltage of approximately 50 to 100 $V_{PP}$ and a frequency of approximately 30 to 60 kHz in order to produce ultrasonic signals. By way of example, an actuation and evaluation circuit comprising a push-pull transformer as coupling transformer is used to produce such an AC voltage, the two primary windings of said transformer being connected alternately to a supply voltage by switches in an application-specific integrated circuit (ASIC). The boosted voltage for the piezo element can then be tapped off at the secondary coil. In this case, the actuation and evaluation circuit, with the secondary coil, a capacitor and a resistor, forms a resonant circuit. Adjusting the elements of this resonant circuit to the piezo element is important in order to convert the electrical energy into acoustic energy and to adjust a reception sensitivity of the actuation and evaluation circuit upon receiving acoustic signals.

Alternatively, the prior art, for example DE 10 2008 061 963 A1, discloses an actuation and evaluation circuit comprising a bipolar DC-DC converter for providing an output voltage with optional polarity on the basis of an input DC voltage. The corresponding actuation and evaluation circuit comprises an input and an output and uses an inductor coil instead of the push-pull transformer. A first switching apparatus is provided in order to optionally connect a first connection and a second connection of the inductor coil to the input. A second switching apparatus is provided in order to connect one of the connections of the inductor coil to the output. This type of actuation of the switching apparatuses produces, at the output, a DC voltage with a desired amplitude and polarity that can be used for actuation for a piezo-ceramic actuator. When such an actuation and evaluation circuit is used in an ultrasonic transducer, the omission of the push-pull transformer means that the secondary inductance of the push-pull transformer is also omitted, with the result that there can be problems with the decay time of the ultrasonic transducer while the echo signals are being received. "Decay time" is understood to mean a time period in which the amplitude of the transmission signal subsides to below a predefined threshold value and defines a measure for a shortest measurable distance of objects from the piezo element. If an echo signal occurs within the decay time, the ultrasonic transducer cannot recognize the echo signal, since the threshold value is already exceeded by the amplitude of the transmission signal. It is therefore important to keep the decay time as short as possible.

In principle, this problem can be solved by using a compensation inductance for a reception mode, as a result of which an adjustment to the actuation and evaluation circuit can be carried out, for example in order to compensate for parasitic capacitances of the piezo element and to achieve decay times such as those in the case of an ultrasonic transducer with a push-pull transformer. A desired adjustment as described above can be carried out with the compensation inductance.

The compensation inductance can be provided by a gyrator circuit that emulates a required inductance value from a reference capacitor. Ultrasonic transducers of this kind comprising a gyrator circuit have proven to be worthwhile in practice and are already widespread because they allow simple and effective actuation of the piezo element. However, it has been found in practice that, in particular during use in or on vehicles, the compensation is sometimes not sufficient, for example in the case of different ambient conditions.

Proceeding from the prior art mentioned above, the invention is therefore based on the object of specifying an ultrasonic transducer and a method for compensating an ultrasonic transducer in order to achieve an improved decay behavior and to allow reliable operation even when being used in vehicles, in particular in the case of different ambient conditions.

The object is achieved according to the invention by the features of the independent claims. Advantageous configurations of the invention are specified in the dependent claims.

The invention therefore specifies an ultrasonic transducer comprising a piezo element, in particular for use on a vehicle, comprising an actuation and evaluation circuit for producing an actuation voltage for the piezo element that produces and emits a measurement signal depending on the actuation voltage, and for outputting an output signal on the basis of an echo signal received at the piezo element, and a gyrator circuit for providing a compensation inductance for adjusting the actuation and evaluation circuit, in particular for compensating for a parasitic connection capacitance of the piezo element, wherein the gyrator circuit is configured with a variable compensation inductance.

The invention furthermore specifies a method for compensating an ultrasonic transducer comprising a piezo element in order to adjust a reception sensitivity, in particular for use on a vehicle, in particular for compensating an ultrasonic transducer as above, comprising the steps of detecting a measured variable for adjusting the reception sensitivity, and compensating the ultrasonic transducer by changing the compensation inductance of the gyrator circuit on the basis of the detected measured variable.

The basic idea of the present invention is therefore to carry out an adjustment of the ultrasonic transducer with the aid of the variable compensation inductance in order to therefore allow optimal operation of the ultrasonic transducer. In this case, the compensation inductance is provided as additional inductance by the gyrator circuit in order to carry out the adjustment. The settability of the compensation inductance makes it possible to carry out the adjustment in an optimal manner in each case. Improved adjustment can therefore be carried out for compensating for component variations of used components of the ultrasonic transducer, in particular of the piezo element. Furthermore, the adjustment of the ultrasonic transducer can also be adjusted during operation. It is therefore possible to compensate for changes to the properties of the ultrasonic transducer due to environmental influences, for example a temperature dependency of used components. In particular, the parasitic connection capacitance of the piezo element is greatly temperature-dependent, meaning that continuous compensation can help to improve the function of the ultrasonic transducer. Furthermore, both the actuation and evaluation circuit and the gyrator circuit can have semiconductor components with a temperature dependency, meaning that this temperature dependency can also be compensated for by changing the compensation inductance. In order to carry out the adjustment of the ultrasonic transducer, it is only necessary to detect a suitable measured variable and to change the compensation inductance on the basis thereof. This can take place in the manner of an open-loop or closed-loop control operation.

The ultrasonic transducer is usually used to form an ultrasonic sensor. To this end, a housing is provided, often with a pot-like shape, which has a diaphragm for emitting ultrasonic signals. The piezo element is attached to the diaphragm so as to excite said diaphragm to effect oscillation and therefore emission of the ultrasonic signals. Furthermore, echoes of the emitted ultrasonic signals can be coupled in via the diaphragm. The piezo element is typically adhesively bonded to the diaphragm.

On the one hand, the actuation and evaluation circuit serves to produce the actuation voltage Us for the piezo element that produces and emits ultrasonic signals depending on the actuation voltage Us. On the other hand, the actuation and evaluation circuit serves to receive and evaluate the received echoes of the emitted ultrasonic signals in order to output output signals corresponding thereto for further processing, for example in order to produce a distance warning when parking the vehicle.

The gyrator circuit provides the compensation inductance. An impedance is transformed into its dual impedance by the gyrator circuit. In order to provide the compensation inductance, a capacitor can therefore be used in the gyrator circuit, which is transformed into the compensation inductance. This is advantageous, since an inductor has less ideal behaviour compared to the capacitor and often takes up a lot of space. A coil has an ohmic wire resistance that is often not negligible and winding capacitances that are disturbing in the high-frequency range. The coil furthermore reacts to ambient alternating magnetic fields and can generate interference due to induction voltages. Coils are also expensive to produce and do not fit into integrated circuits.

The gyrator circuit is typically connected in parallel with the actuation and evaluation circuit. By way of example, the gyrator circuit can be connected on the input side between the actuation voltage of the piezo element and ground. The gyrator circuit can be provided in a different way, as is described below. Depending on the type of gyrator circuit, the change to the compensation inductance, that is to say the change to a provided inductance value, can be realized in a different way, as is explained below.

By way of example, a resonant circuit of the actuation and evaluation circuit can be adjusted in terms of its resonant frequency using the compensation inductance in order thereby to improve the reception sensitivity of the ultrasonic transducer. In particular, a parasitic connection capacitance of the piezo element is compensated for in this case.

Different parameters can be detected as measured variables, which provide a measure for determining the adjustment of the reception sensitivity. By way of example, a temperature can be detected on account of the temperature dependency of the connection capacitance of the piezo element, for example. Further options for determining a significant measured variable are specified below.

In principle, it is also possible to detect a plurality of measured variables in order, therefrom, to jointly determine a measure for the change of the compensation inductance and to carry out the adjustment The change to the compensation inductance comprises either a relative change on the basis of, for example, a present compensation inductance, or the setting of the compensation inductance to a defined value.

In an advantageous configuration of the invention, the gyrator circuit is configured as a logic circuit, in particular comprising a negative impedance converter, two outer ohmic resistors and a reference capacitor, wherein the gyrator circuit is configured to convert the value of the reference capacitor, using the negative impedance converter, to a corresponding inductance value by means of phase shifting, wherein the inductance value is calculated from the product of the two values of the ohmic resistors and the value of the reference capacitor, and wherein at least one of the two resistors is adjustable in order to change the compensation inductance. A logic circuit of this kind can be integrated into the ultrasonic transducer in a simple manner. In principle, it is also possible to provide the actuation and evaluation circuit together with the gyrator circuit as a logic circuit. The preferable implementation of the gyrator circuit comprising the negative impedance converter, the two outer ohmic resistors and the reference capacitor allows simple provision of the gyrator circuit. Changing the compensation inductance of the gyrator circuit can be realized in a simple manner by adjusting the ohmic resistor. In principle, it is sufficient to only adjust one of the two ohmic resistors, or to only configure one of the two ohmic resistors to be adjustable, with the result that the gyrator circuit can be provided in a cost-effective manner. The adjustable ohmic resistor can be implemented in different ways. It is not necessary to configure the ohmic resistor in the form of a potentiometer as long as the corresponding resistance value of the ohmic resistor is settable. The negative impedance converter is preferably implemented with an inverting operational amplifier.

In an advantageous configuration of the invention, the two outer ohmic resistors include a first ohmic resistor and a second ohmic resistor, wherein the first ohmic resistor is arranged between an input of the gyrator circuit and the negative impedance converter and the second ohmic resistor is arranged between the negative impedance converter and ground, and the second ohmic resistor is adjustable. Changing the ohmic resistance can be carried out in a simple manner, meaning that changing the compensation inductance can also be carried out in a simple manner.

In an advantageous configuration of the invention, the adjustable ohmic resistor is configured as a channel resistance of a transistor, and the ohmic resistor is adjustable by adjusting a channel resistance of the transistor. The ohmic resistor is therefore provided by setting the operating point of the transistor. Adjusting the operating point of the transistor can change the ohmic resistor in terms of its resistance value. The ohmic resistor can therefore be adjusted by purely electronic actuation of the transistor. The resistor adjusted in this way can be provided and used as part of an integrated circuit in a simple manner.

In an advantageous configuration of the invention, the gyrator circuit is configured as an integrated circuit, in particular as an integrated component. The integrated circuit allows compact provision of the gyrator circuit that can be used in a simple manner. In principle, it is also possible to provide the actuation and evaluation circuit together with the gyrator circuit as a logic circuit. Particularly preferably, the actuation and evaluation circuit and the gyrator circuit can be provided together as an integrated component.

In an advantageous configuration of the invention, the actuation and evaluation circuit has a coupling transformer. The coupling transformer serves to couple electrical energy into the actuation and evaluation circuit for actuating the piezo element. The piezo element can emit the coupled-in electrical energy as ultrasonic signals. The coupling transformer provides an inductance of the actuation and evaluation circuit by way of its secondary coil.

In an advantageous configuration of the invention, the actuation and evaluation circuit is configured as a transformerless semiconductor circuit, in particular comprising an inductor coil and a plurality of semiconductor switching elements. Such actuation and evaluation circuits allow simple and reliable actuation of the piezo element for emitting ultrasonic signals. The semiconductor switching elements alternately connect the inductor coil to a supply voltage in order to actuate the piezo element in a desired manner to output the ultrasonic signals.

In an advantageous configuration of the invention, detecting a measured variable for adjusting the reception sensitivity comprises detecting a decay frequency of the ultrasonic transducer. The decay frequency of the ultrasonic transducer, in particular of the actuation and evaluation circuit, is an important variable for the behavior of the ultrasonic transducer. Due to its structure, the piezo element typically has a frequency behavior comparable to an electrical resonant circuit, wherein, by way of external circuitry, an adjustment is made by the actuation and evaluation circuit in order to achieve a desired decay frequency of the ultrasonic transducer. This allows optimal operation of the ultrasonic transducer. Detecting the decay frequency of the ultrasonic transducer makes it possible to therefore detect a variable that directly describes the behavior, which is to be adjusted, of the ultrasonic transducer. By way of example, the decay frequency can therefore be continuously readjusted for the ultrasonic transducer.

In an advantageous configuration of the invention, detecting a measured variable for adjusting the reception sensitivity comprises outputting a defined measurement level and receiving a measurement signal on the basis of the measurement level. The measurement signal is an echo on the basis of the defined measurement level. The measurement level is an ultrasonic signal having one or more pulses with a defined level. On the basis of this, the level that the received echo, that is to say the measurement signal, has can be determined. In the event of incorrect adjustment, the measurement signal will have a level that is too low.

In an advantageous configuration of the invention, changing the compensation inductance of the gyrator circuit on the basis of the detected measured variable comprises changing the compensation inductance on the basis of a lookup table for different values of the measured variable. The setting can be carried out in a very simple and efficient manner on the basis of the lookup table. In this case, ranges or intervals of the detected measured variable are preferably defined, in which ranges or intervals the compensation inductance has to be adjusted or set in a particular way in order to carry out the adjustment.

The invention is explained in more detail below with reference to the attached drawing and on the basis of preferred embodiments. The features shown may each represent an aspect of the invention both individually and in combination. Features of different exemplary embodiments may be transferred from one exemplary embodiment to another.

Figure 2:
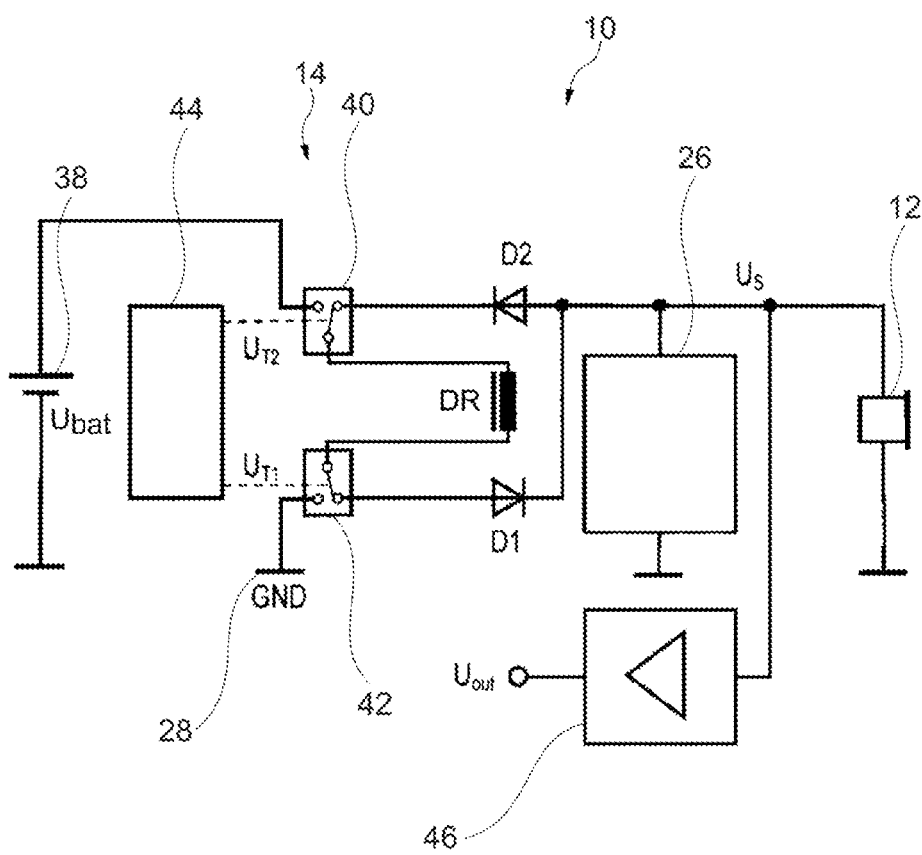
Figure 3:
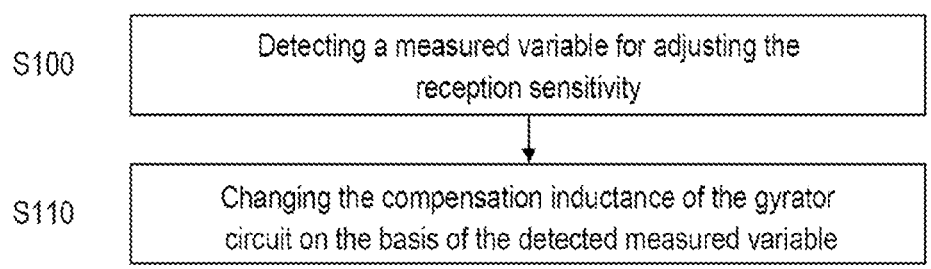

In the figures:

FIG. 1 shows a schematic view of an ultrasonic transducer according to a first, preferred embodiment, comprising a piezo element and an actuation and evaluation circuit comprising a coupling transformer, FIG. 2 shows a schematic view of an ultrasonic transducer according to a second embodiment, comprising a piezo element and an actuation and evaluation circuit comprising an inductor coil and two switching apparatuses, and FIG. 3 shows a flow chart of a method for compensating an ultrasonic transducer from one of FIGS. 1 and 2 in accordance with the first and the second embodiment.

FIG. 1 shows an ultrasonic transducer 10 according to a first, preferred embodiment.

The ultrasonic transducer 10 is configured for use on a vehicle. The ultrasonic transducer 10 is part of an ultrasonic sensor, which is not illustrated in more detail here, comprising a housing having a pot-like shape and a diaphragm for emitting ultrasonic signals.

The ultrasonic transducer 10 comprises a piezo element 12 and an actuation and evaluation circuit 14. The piezo element 12 is attached to the diaphragm so as to excite said diaphragm to effect oscillation and therefore emission of the ultrasonic signals. Furthermore, echoes of the emitted ultrasonic signals can be coupled in via the diaphragm. The piezo element 12 is adhesively bonded to the diaphragm. The actuation and evaluation circuit 14 produces an actuation voltage Us for the piezo element 12 that produces and emits an ultrasonic signal as a measurement signal depending on the actuation voltage Us. Furthermore, the actuation and evaluation circuit 14 outputs an output signal Uout on the basis of an echo signal received at the piezo element 12, as is shown by way of example for the ultrasonic transducer 10 of the second exemplary embodiment. The echo signal is an echo of the emitted measurement signal from an object in the surroundings of the vehicle.

In this exemplary embodiment, the actuation and evaluation circuit 14 comprises a coupling transformer 16 for coupling electrical energy into the actuation and evaluation circuit 14 in order to actuate the piezo element 12. The secondary coil 18 of the coupling transformer 16 is shown in FIG. 1. The ultrasonic transducer 10 furthermore has a resistor 20 and a capacitor 22 that form a resonant circuit 24 together with the secondary coil 18.

The ultrasonic transducer 10 furthermore comprises a gyrator circuit 26 for providing a compensation inductance for adjusting the actuation and evaluation circuit 14, in particular for compensating for a parasitic connection capacitance of the piezo element 12, as is shown in FIG. 1. In this exemplary embodiment, the gyrator circuit 26 is configured as an integrated logic circuit. The gyrator circuit 26 is connected in parallel with the actuation and evaluation circuit 14. Accordingly, the gyrator circuit 26 is connected on the input side between the actuation voltage Us of the piezo element 12 and ground 28.

In detail, the gyrator circuit 26 comprises a negative impedance converter 30, with two outer ohmic resistors $R_{LP}$, R and a reference capacitor $C_{LP}$, the value of which is converted by the negative impedance converter 30, by means of phase shifting, to a corresponding inductance value that is calculated from the product of the two values of the ohmic resistors $R_{LP}$, R and the value of the reference capacitor $C_{LP}$. The compensation inductance is obtained as a result. The gyrator circuit 26 therefore emulates the required inductance value of the compensation inductance in order, for example, to compensate for parasitic connection capacitances in the piezo element 12 from the reference capacitor $C_{LP}$. The negative impedance converter 30 is configured as an operational amplifier.

Of the two outer ohmic resistors $R_{LP}$, R, a first ohmic resistor $R_{LP}$, which is arranged between an input of the gyrator circuit 26 and an inverting input 32 of the negative impedance converter 30, is configured with a fixed resistance value, that is to say that the first ohmic resistor $R_{LP}$ is not adjustable. A second ohmic resistor R of the two outer ohmic resistors $R_{LP}$, R, which is arranged between a non-inverting input 34 of the negative impedance converter 30 and ground 28, is configured to be adjustable. To this end, the second ohmic resistor R is configured as a channel resistance of a transistor that is not shown here, wherein the second ohmic resistor R is adjustable by adjusting the channel resistance of the transistor. The second ohmic resistor R is therefore provided by setting an operating point of the transistor and can be changed in terms of its resistance value by adjusting its operating point.

The compensation inductance of the gyrator circuit 26 can therefore be changed by adjusting the second ohmic resistor R. As a result, the resonant circuit 24 of the actuation and evaluation circuit 14 is changed and adjusted in terms of its resonant frequency, as is explained below.

Finally, the gyrator circuit 26 of the first exemplary embodiment additionally comprises a switching apparatus 36, by way of which the compensation inductance can be connected to, or isolated from, the actuation voltage Us.

A method for compensating the ultrasonic transducer 10 from FIG. 1 in order to adjust a reception sensitivity is described below.

The method comprises a first step S100 for detecting a measured variable for adjusting the reception sensitivity. In the first exemplary embodiment described here, a decay frequency of the ultrasonic transducer 10 is detected as a measured variable. In an alternative exemplary embodiment, the ultrasonic transducer 10 is first excited to output a defined measurement level in order then to receive a measurement signal on the basis of the measurement level. In this case, the measurement signal is an echo on the basis of the defined measurement level, that is to say an ultrasonic signal having one or more pulses with a defined level. The level that the received echo, that is to say the measurement signal, has is determined. In the event of incorrect adjustment, the measurement signal has a measurement level that is too low.

In a second step S110, the compensation inductance of the gyrator circuit 26 is changed on the basis of the detected measured variable. In the first exemplary embodiment, the decay frequency is continuously readjusted for the ultrasonic transducer 10 on the basis of the measured variable in order to maintain a desired decay frequency. Alternatively, the compensation inductance of the gyrator circuit 26 can be set in the manner of an open-loop control operation. The change to the compensation inductance can either be a relative change, for example in comparison to a present compensation inductance, or the setting of the compensation inductance to a defined value. The latter can be realized by virtue of, on the basis of the detected measured variable, the compensation inductance being changed on the basis of a lookup table. In this case, ranges or intervals of the detected measured variable are preferably defined, in which ranges or intervals the compensation inductance has to be set in a particular way in order to carry out the adjustment.

FIG. 2 shows an ultrasonic transducer 10 according to a second embodiment. The ultrasonic transducer 10 of the second embodiment partially corresponds to the ultrasonic transducer 10 of the first embodiment, for which reason identical or similar components are provided with the same reference signs.

The ultrasonic transducer 10 of the second embodiment comprises a piezo element 12 and an actuation and evaluation circuit 14. The actuation and evaluation circuit 14 produces an actuation voltage Us for the piezo element 12 that produces and emits a measurement signal depending on the actuation voltage Us. The explanations given above in relation to the measurement signal apply.

The actuation and evaluation circuit 14 is connected to a voltage supply 38. By way of example, the voltage supply 38 is in this case depicted as a battery, which provides a battery voltage Ubat as supply voltage. In this exemplary embodiment, the voltage supply 38 is a vehicle battery.

In this exemplary embodiment, the actuation and evaluation circuit 14 is configured as a transformerless semiconductor circuit. This circuit comprises two changeover units 40, 42 and an inductor coil DR. Furthermore, the actuation and evaluation circuit 14 comprises two diodes D1, D2, the actuation voltage Us being provided at the crossover point thereof. The inductor coil DR is either connected to the voltage supply 38 or to the piezo element 12 by way of the changeover units 40, 42. A logic unit 44 of the actuation and evaluation circuit 14 controls the changeover of the two changeover units 40, 42. The two changeover units 40, 42 are configured as transistor-based semiconductor switching elements.

As is shown in FIG. 2, a gyrator circuit 26 is arranged in parallel with the piezo element 12. The gyrator circuit 26 corresponds to the gyrator circuit 26 described above with respect to the first exemplary embodiment.

Furthermore, a receiving amplifier 46 is arranged in parallel with the piezo element 12. The receiving amplifier 46 amplifies an echo signal received via the piezo element 12 in response to the measurement signal, and outputs it as output signal Uout.

The ultrasonic transducer 10 of the second embodiment is also configured to carry out the method, which is described above in relation to the first embodiment, for compensating the ultrasonic transducer 10 in order to adjust a reception sensitivity. Accordingly, as described above, the method can also be carried out with the ultrasonic transducer 10 of the second embodiment.

LIST OF REFERENCE SIGNS

10 Ultrasonic transducer
12 Piezo element
14 Actuation and evaluation circuit
16 Coupling transformer
18 Secondary coil
20 Resistor
22 Capacitor
24 Resonant circuit
26 Gyrator circuit
28 Ground
30 Impedance converter
32 Inverting input
34 Non-inverting input
36 Switching apparatus
38 Voltage supply, battery
40 Changeover unit, semiconductor switching element
42 Changeover unit, semiconductor switching element 44 Logic unit
46 Receiving amplifier
Us Actuation voltage
Uout Output signal
$R_{LP}$ First ohmic resistor
R Second ohmic resistor
$C_{LP}$ Reference capacitor
Ubat Battery voltage
DR Inductor coil
D1 Diode
D2 Diode

The invention claimed is:

1. An ultrasonic transducer comprising a piezo element for use on a vehicle, comprising:
   an actuation and evaluation circuit for producing an actuation voltage for the piezo element that produces and emits an ultrasonic signal depending on the actuation voltage, and for outputting an output signal on the basis of an echo signal received at the piezo element; and
   a gyrator circuit for continuously providing a compensation inductance for adjusting the actuation and evaluation circuit for compensating for a parasitic connection capacitance of the piezo element,
   wherein the gyrator circuit is configured with a variable compensation inductance, and
   wherein the gyrator circuit comprises a switching apparatus to connect and isolate the compensation inductance to and from the actuation voltage.

2. The ultrasonic transducer as claimed in claim 1, wherein the gyrator circuit is configured as a logic circuit, comprising:
   a negative impedance converter,
   two outer ohmic resistors, and
   a reference capacitor, wherein
   the gyrator circuit is configured to convert the value of the reference capacitor, using the negative impedance converter, to a corresponding inductance value by means of phase shifting, wherein the inductance value is calculated from the product of the two values of the ohmic resistors and the value of the reference capacitor, and wherein
   at least one of the two resistors is adjustable to change the compensation inductance.

3. The ultrasonic transducer as claimed in claim 2, wherein the two outer ohmic resistors include a first ohmic resistor and a second ohmic resistor, wherein the first ohmic resistor is arranged between an input of the gyrator circuit and the negative impedance converter and the second ohmic resistor is arranged between the negative impedance converter and ground, and the second ohmic resistor is adjustable.

4. The ultrasonic transducer as claimed in claim 2, wherein the adjustable ohmic resistor is configured as a channel resistance of a transistor, and the adjustable ohmic resistor is adjustable by adjusting a channel resistance of the transistor.

5. The ultrasonic transducer as claimed in claim 1, wherein the gyrator circuit is configured as an integrated circuit, in particular as an integrated component.

6. The ultrasonic transducer as claimed in claim 1, wherein the actuation and evaluation circuit has a coupling transformer.

7. The ultrasonic transducer as claimed in claim 1, wherein the actuation and evaluation circuit is configured as a transformerless semiconductor circuit, in particular comprising an inductor coil and a plurality of semiconductor switching elements.

8. A method for compensating an ultrasonic transducer comprising a piezo element to adjust a reception sensitivity, for use on a vehicle as claimed in claim 1, the method comprising:
   detecting a single measured variable for adjusting the reception sensitivity, and
   compensating the ultrasonic transducer by changing the compensation inductance of the gyrator circuit on the basis of the detected single measured variable.

9. The method as claimed in claim 8, wherein detecting a single measured variable for adjusting the reception sensitivity comprises detecting a decay frequency of the ultrasonic transducer.

10. The method as claimed in claim 8, wherein detecting a single measured variable for adjusting the reception sensitivity comprises outputting a defined measurement level and receiving a measurement signal on the basis of the measurement level.

11. The method as claimed in claim 8, wherein changing the compensation inductance of the gyrator circuit on the basis of the single detected measured variable comprises changing the compensation inductance on the basis of a lookup table for different values of the single measured variable.

* * * * *